(12) United States Patent
Schlund et al.

(10) Patent No.: US 8,991,178 B2
(45) Date of Patent: Mar. 31, 2015

(54) INTERNAL COMBUSTION ENGINE HAVING AN EXHAUST-GAS AND CHARGE-AIR GUIDANCE ARRANGEMENT

(71) Applicant: Dr. Ing. h.c. F. Porsche Aktiengesellschaft, Stuttgart (DE)

(72) Inventors: Jochen Schlund, Stuttgart (DE); Erwin Rutschmann, Tiefenbronn (DE); Norbert Hemmerlein, Pforzheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 139 days.

(21) Appl. No.: 13/713,702

(22) Filed: Dec. 13, 2012

(65) Prior Publication Data

US 2013/0167528 A1 Jul. 4, 2013

(30) Foreign Application Priority Data

Dec. 30, 2011 (DE) .......................... 10 2011 090 160

(51) Int. Cl.
| | |
|---|---|
| *F02B 33/44* | (2006.01) |
| *F02D 23/00* | (2006.01) |
| *F02B 33/00* | (2006.01) |
| *F02D 13/06* | (2006.01) |
| *F02M 25/07* | (2006.01) |

(Continued)

(52) U.S. Cl.
CPC ................ *F02M 25/07* (2013.01); *F02B 47/08* (2013.01); *F02M 25/0707* (2013.01); *F02D 17/00* (2013.01); *F02B 37/002* (2013.01); *F02B 37/007* (2013.01); *F02B 37/16* (2013.01); *F01N 13/011* (2013.01); *Y02T 10/121* (2013.01); *Y02T 10/144* (2013.01); *F01N 13/107* (2013.01)
USPC ............. 60/612; 60/602; 123/562; 123/198 F

(58) Field of Classification Search
CPC ...... F02B 37/007; F02B 37/001; F02D 17/00; F02D 17/02; F01N 13/011; Y02T 10/144
USPC .......................... 60/612, 602; 123/562, 198 F
See application file for complete search history.

(56) References Cited

U.S. PATENT DOCUMENTS 4,452,208 A * 6/1984 Merlini et al. ............. 123/198 F
5,582,004 A 12/1996 Rutschmann
(Continued)

FOREIGN PATENT DOCUMENTS

DE 44 31 058 C1 8/1995

*Primary Examiner* — Thai Ba Trieu
*Assistant Examiner* — Ngoc T Nguyen
(74) *Attorney, Agent, or Firm* — RatnerPrestia

(57) ABSTRACT

An internal combustion engine has first and second non-deactivatable cylinder banks. Each cylinder bank is assigned exhaust lines which extend from exhaust manifolds. First and second exhaust-gas turbocharger in the exhaust line are assigned to the first and second cylinders, respectively. A first catalytic converter in the first exhaust line contains the first exhaust-gas turbocharger, and is arranged downstream of the first exhaust-gas turbocharger as viewed in the flow direction of the exhaust gas of the first cylinder bank. A second catalytic converter in the second exhaust line contains the second exhaust-gas turbocharger, and is arranged downstream of the second exhaust-gas turbocharger as viewed in the flow direction of the exhaust gas of the second cylinder bank. A flow transfer line is arranged between the first and the second exhaust line, and a first control element, by an exhaust-gas mass flow passing through the flow transfer line can be regulated.

13 Claims, 2 Drawing Sheets

(51) Int. Cl.
*F02B 47/08* (2006.01)
*F02D 17/00* (2006.01)
*F02B 37/00* (2006.01)
*F02B 37/007* (2006.01)
*F02B 37/16* (2006.01)
*F01N 13/00* (2010.01)
*F01N 13/10* (2010.01)

(56) References Cited

U.S. PATENT DOCUMENTS

| | | | |
|---|---|---|---|
| 7,028,678 B2 * | 4/2006 | Betz et al. | 60/612 |
| 7,640,728 B2 * | 1/2010 | Yoshizaki et al. | 60/303 |
| 2008/0314028 A1 * | 12/2008 | Christner et al. | 60/301 |
| 2009/0090098 A1 * | 4/2009 | Sugiyama | 60/287 |
| 2010/0011762 A1 * | 1/2010 | Hokuto et al. | 60/602 |

* cited by examiner

INTERNAL COMBUSTION ENGINE HAVING AN EXHAUST-GAS AND CHARGE-AIR GUIDANCE ARRANGEMENT

CROSS-REFERENCE TO RELATED APPLICATIONS

This application claims priority to German Patent Application No. 10 2011 090 160.4, filed Dec. 30, 2011, which is incorporated by reference herein in its entirety.

FIELD OF THE INVENTION

The present invention relates to an internal combustion engine, in particular a supercharged internal combustion engine having an exhaust-gas and charge-air guidance arrangement.

BACKGROUND OF THE INVENTION

Internal combustion engines in which one group of cylinders is operated permanently and another group of cylinders can be deactivated are generally known. In a two-bank engine concept with cylinder deactivation, it is possible, when a bank is deactivated, for an associated catalytic converter to cool down. The conversion rate falls considerably as a result.

DE 4431058 C1, which is incorporated by reference, discloses an internal combustion engine having a deactivatable cylinder group, which has an exhaust system. The catalytic converter assigned to the deactivatable cylinder group is traversed by flow to such an extent that said catalytic converter does not cool down to too great an extent after the deactivation of the cylinder group, such that it is possible for the catalytic converter to take effect quickly after reactivation of the cylinder group.

If in each case one catalytic converter is arranged in the exhaust lines of the permanently operated cylinder assembly and of the deactivatable cylinder assembly, a bypass line runs between said two catalytic converters and the catalytic converter assigned to the exhaust line of the permanently operated cylinder assembly can, downstream thereof, be entirely or partially blocked or throttled, cooling of the catalytic converter of the deactivatable cylinder group after the deactivation of said cylinder group can be substantially prevented.

The cooling of the catalytic converter assigned to the deactivatable cylinder group can be prevented if the bypass line extends from the exhaust line of the permanently operated cylinder assembly upstream of the catalytic converter assigned to said cylinder assembly, and issues into the exhaust line of the deactivatable cylinder assembly upstream of the corresponding catalytic converter. When the blocking element is completely closed, it is thus possible for the very hot exhaust-gas flow branched off upstream of said catalytic converter to heat the catalytic converter situated in the shut-off exhaust line. When the blocking element is partially closed, it is possible to realize an apportionment of the exhaust-gas flow of the permanently operated cylinder assembly, such that both catalytic converters are impinged on by a partial exhaust-gas flow. Cooling of the catalytic converter of the deactivated cylinder assembly is thus substantially prevented.

A problem in a two-bank engine concept with cylinder deactivation and additional bank-specific supercharging is however the fact that exhaust gas does not flow through the turbine situated on the deactivated bank, and said turbine thus comes to a standstill. This has the effect firstly that the sealing action of the radial shaft sealing rings on the charger shaft is decreased because the seal is ensured only while the rotor is rotating. Secondly, this has the effect that the turbocharger does not deliver a charge pressure upon activation of the inactive bank, which manifests itself in unfavorable response behavior.

SUMMARY OF THE INVENTION

Against this background, the present invention provides an improved internal combustion engine with exhaust-gas and charge-air guidance, which permits a higher conversion rate of the catalytic converter and/or an improved response behavior of a turbocharger.

The invention specifies an internal combustion engine, in particular a multi-cylinder internal combustion engine, which has a first, non-deactivatable cylinder bank and a second, deactivatable cylinder bank. Each cylinder bank is assigned exhaust lines which extend from exhaust manifolds. The internal combustion engine furthermore has a first exhaust-gas turbocharger in the exhaust line assigned to the first cylinder bank, and a second exhaust-gas turbocharger in the exhaust line assigned to the second cylinder bank. The internal combustion engine furthermore comprises a first catalytic converter in the first exhaust line which contains the first exhaust-gas turbocharger, which first catalytic converter is arranged downstream of the first exhaust-gas turbocharger as viewed in the flow direction of the exhaust gas of the first cylinder bank, and a second catalytic converter in the second exhaust line which contains the second exhaust-gas turbocharger, which second catalytic converter is arranged downstream of the second exhaust-gas turbocharger as viewed in the flow direction of the exhaust gas of the second cylinder bank. The internal combustion engine furthermore has a flow transfer line which is arranged between the first and the second exhaust line, and a first control element, by means of which an exhaust-gas mass flow passing through the flow transfer line can be regulated.

Owing to the ability to regulate the exhaust-gas mass flow passing through the flow transfer line by means of the first control element, it is thus possible for an exhaust-gas mass flow to be transferred from the first exhaust line into the second exhaust line.

It is preferably the case that, when the second cylinder bank is activated, a passage through the control element can be blocked, and when the second cylinder bank is deactivated, the passage through the control element can be at least partially opened up. As a result of the blocking capability of the control element when the second cylinder bank is activated, the exhaust-gas mass flow of the first exhaust line is not supplied to the second exhaust line. The second exhaust-gas turbocharger is thus impinged on exclusively by an exhaust-gas mass flow of the second cylinder or of the second exhaust line. As a result of the at least partial opening capability of the control element when the second cylinder bank is deactivated, an exhaust-gas mass flow of the first exhaust line is at least partially supplied to the second exhaust line.

In this way, the rotor of the second turbocharger is prevented from coming to a standstill, and the sealing action of the radial shaft sealing rings on the charger shaft is ensured. Furthermore, owing to the impingement of the exhaust-gas mass flow of the first exhaust line on the second turbocharger, a charge pressure is generated which manifests itself in a favorable response behavior of the second turbocharger. Furthermore, as a result of the transfer of the exhaust-gas mass flow of the first exhaust line into the second exhaust line, the catalytic converter of the second exhaust line is likewise impinged on by an exhaust-gas mass flow, as a result of which cooling of the catalytic converter is prevented.

In a further preferred exemplary embodiment, it is provided that, when the second cylinder bank is activated, a passage through the control element can be opened up, and when the second cylinder bank is deactivated, the passage through the control element can be at least partially opened up. As a result of the opening capability of the control element when the second cylinder bank is activated, the second exhaust line can be opened up. When the second cylinder bank is activated, the second turbocharger can thus be impinged on by an exhaust-gas mass flow of the first exhaust line and by an exhaust-gas mass flow of the second exhaust line. Owing to the exhaust-gas back pressure in the second exhaust line between the second cylinder bank and the second turbocharger and the back pressure of the first exhaust line between the first cylinder bank and the first turbocharger, pressure equalization between the first exhaust line and the second exhaust line thus takes place via the flow transfer line. The first and second turbochargers are thus impinged on in each case by an exhaust-gas mass flow with an equal back pressure.

As a result of the at least partial opening capability of the control element when the second cylinder bank is deactivated, the exhaust-gas mass flow of the first exhaust line is transferred into the second exhaust line. The second turbocharger can thus be impinged on by an exhaust-gas mass flow, as a result of which the rotor of the second turbocharger is prevented from coming to a standstill. This has the effect that the sealing action of the radial shaft sealing rings on the charger shaft does not decrease. Furthermore, owing to the impingement of an exhaust-gas mass flow on the second turbocharger, a charge pressure is generated, as a result of which the response behavior of the turbocharger is improved. The catalytic converter of the second exhaust line is furthermore likewise impinged on by an exhaust-gas mass flow, as a result of which cooling of the catalytic converter is prevented.

In the preferred embodiment of the invention, it is provided that the flow transfer line is connected to the exhaust line which contains the first exhaust-gas turbocharger, downstream of the first exhaust-gas turbocharger as viewed in the flow direction of the exhaust gas of the first cylinder bank. As a result of the arrangement of the flow transfer line in the first exhaust line downstream of the first exhaust-gas turbocharger, it is thus ensured that the first turbocharger is impinged on by the exhaust-gas mass flow of the first exhaust line before the exhaust-gas mass flow of the first exhaust line is at least partially transferred to the second exhaust line.

It is advantageously provided that the flow transfer line is connected to the exhaust line which contains the first exhaust-gas turbocharger, downstream of the first exhaust-gas turbocharger and upstream of the first catalytic converter as viewed in the flow direction of the exhaust gas of the first cylinder bank. It can thus be ensured that the first turbocharger arranged in the first exhaust line is impinged on by the entire exhaust-gas mass flow of the first exhaust line, and the first catalytic converter positioned downstream of the first exhaust-gas turbocharger is impinged on by at least a part of the first exhaust-gas mass flow of the first exhaust line, wherein a remaining part of the exhaust-gas mass flow of the first exhaust line is used for a flow to the second turbocharger of the second exhaust line.

In the further preferred exemplary embodiment, the flow transfer line is connected to the exhaust line which contains the first exhaust-gas turbocharger, upstream of the first exhaust-gas turbocharger as viewed in the flow direction of the exhaust gas of the first cylinder bank. In this way, a greater amount of the exhaust-gas mass flow of the first exhaust line can be supplied via the flow transfer line to the second exhaust line. The exhaust-gas mass flow which passes through the flow transfer line is furthermore at a higher temperature in relation to that in the case of the arrangement of the flow transfer line downstream of the exhaust-gas turbocharger of the first exhaust line. Owing to the higher rotational speed of the turbine of the second exhaust-gas turbocharger, a response behavior of the second exhaust-gas turbocharger can thus be improved. Owing to the higher temperature of the exhaust-gas mass flow, the catalytic converter of the second exhaust line can be impinged on by the exhaust-gas mass flow at higher temperature, as a result of which cooling of the catalytic converter can be prevented even more effectively.

In the preferred exemplary embodiment and the further exemplary embodiment, the flow transfer line is connected to the exhaust line which contains the second exhaust-gas turbocharger, upstream of the second exhaust-gas turbocharger as viewed in the flow direction of the exhaust gas of the second cylinder bank. It is thus possible for an exhaust-gas mass flow of the first exhaust line to be supplied to the turbocharger of the second exhaust line regardless of the location at which the flow transfer line is connected to the first exhaust line.

In the preferred exemplary embodiment, the first control element is arranged in the flow transfer line. In this way, for example when the second cylinder bank is not deactivated, it is possible for an exhaust-gas mass flow of the first exhaust line to be separated from the exhaust-gas mass flow of the second exhaust line by virtue of the first control element in the flow transfer line being placed into a blocking position.

In the further preferred exemplary embodiment, the first control element is arranged in the exhaust line which contains the second exhaust-gas turbocharger, downstream of the second exhaust-gas turbocharger as viewed in the flow direction of the exhaust gas of the second cylinder bank. As a result of the branching of the flow transfer line from the first exhaust line upstream of the first exhaust-gas turbocharger and a connection of the flow transfer line to the second exhaust line upstream of the second exhaust-gas turbocharger, the temperature of the exhaust-gas mass flow passing through the flow transfer line is increased owing to the vicinity of the flow transfer line to the cylinder banks. The arrangement of the control element downstream of the second exhaust-gas turbocharger is therefore advantageous because, in the case of an arrangement upstream of the second exhaust-gas turbocharger, the control element would be exposed to an excessively high temperature.

In one advantageous refinement of the invention, it is provided that the first control element is arranged in the exhaust line which contains the second exhaust-gas turbocharger, downstream of the second exhaust-gas turbocharger and upstream of the second catalytic converter as viewed in the flow direction of the exhaust gas of the second cylinder bank. In this way, in the event of a partial or complete opening of the control element, the second exhaust-gas turbocharger can be impinged on by an exhaust-gas flow, and the temperature of the catalytic converter of the second exhaust line can be maintained.

In the preferred exemplary embodiment and the further exemplary embodiment, it is provided that a second control element is provided in a charge air line, by means of which second control element, when the second cylinder bank is activated, a passage through the control element can be opened up, and when the second cylinder bank is deactivated, the passage through the control element can be blocked. In this way, when the second cylinder bank is activated, an air supply to the second cylinder bank is permitted, and when the second cylinder bank is deactivated, a vacuum is prevented from being generated in the second charge air line of the second exhaust-gas turbocharger.

It is preferably also provided that, when an activation of the second cylinder bank is predicted, the exhaust-gas mass flow through the first control element can be increased. It is thus possible for the exhaust-gas turbocharger of the second exhaust line to be correspondingly brought to rotational speed before the second cylinder bank is activated.

In one advantageous refinement of the invention, it is provided that, when the second cylinder bank is deactivated, the second catalytic converter can be impinged on by the exhaust-gas mass flow of the first exhaust-gas turbocharger. Cooling of the second catalytic converter, and thus a fall in the conversion rate, while the second cylinder bank is deactivated can thus be prevented.

BRIEF DESCRIPTION OF THE DRAWINGS

Exemplary embodiments of the inventions are illustrated in the Figures of the drawing and are explained in more detail in the following description, in which.

DETAILED DESCRIPTION OF THE DRAWINGS

Figure 1:
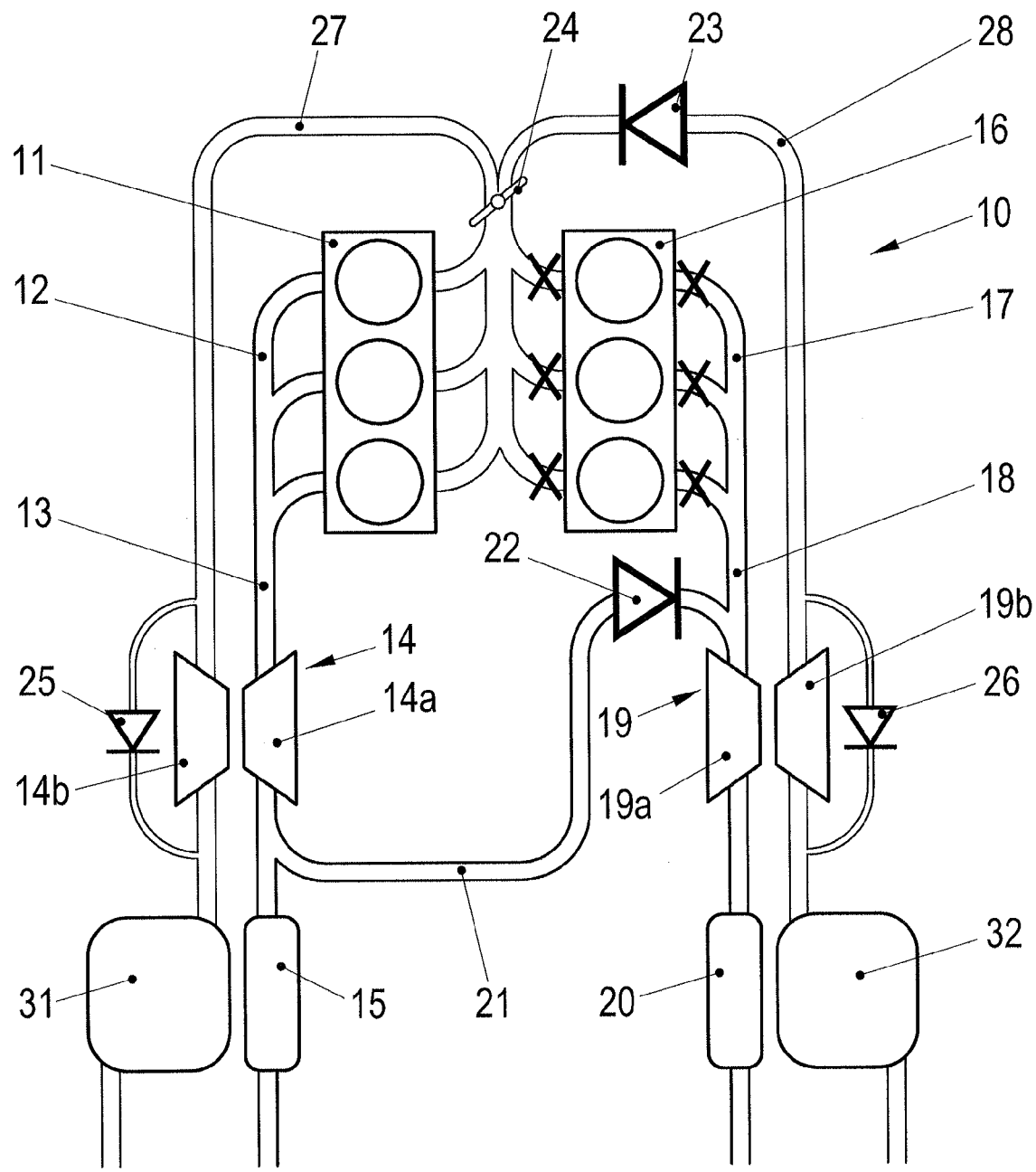
FIG. 1 shows a perspective view of a preferred exemplary embodiment of the internal combustion engine according to aspects of the invention.

In the Figures, the same reference numerals are used to denote identical or functionally identical components.

An internal combustion engine 10 as per FIG. 1, in particular a supercharged internal combustion engine 10, has a first, non-deactivatable cylinder bank 11 with an associated air supply system and exhaust system and has a second, deactivatable cylinder bank 16 with an associated air supply system and exhaust system.

The first, non-deactivatable cylinder bank 11 has three cylinders, and the second, deactivatable cylinder bank 16 likewise has three cylinders.

The air supply system of the first, non-deactivatable cylinder bank 11 has an air filter 31, a compressor 14b of an exhaust-gas turbocharger 14, an overrun air recirculation valve 25, a charge air line 27, a throttle flap 24 and an intake manifold.

Intake air flows through the air filter 31 into the charge air line 27, wherein during operation of the turbocharger 14, the compressor 14b in the charge pressure line 27 generates a charge pressure. The charge air generated is subsequently supplied to the first, non-deactivatable cylinder bank 11 through the throttle flap 24 and the intake manifold. The overrun air recirculation valve 25 is arranged in the charge air line 27 and is activated for example by negative pressure. When the engine switches to overrun operation, the overrun air recirculation valve is opened. When the throttle flap 24 is closed and charge pressure still prevails, opening of the overrun air recirculation valve thus prevents a back pressure in the compressor circuit. A compressor wheel of the compressor 14b is thus not braked, but rather the full charger rotational speed is available.

In a preferred embodiment of the invention, the exhaust system of the first, non-deactivatable cylinder bank 11 has an exhaust manifold 12, a first exhaust line 13, a first exhaust-gas turbocharger 14 or a turbine 14a of the exhaust-gas turbocharger 14, a flow transfer line 21 and a first control element 22 arranged in the flow transfer line 21 and a first catalytic converter 15.

The exhaust manifold 12 of the first, non-deactivatable cylinder bank 11 issues into the first exhaust line 13, wherein the first exhaust-gas turbocharger 14 is arranged in the first exhaust line 13 and the first catalytic converter 15 is arranged downstream of the first exhaust-gas turbocharger 14 as viewed in the flow direction of the exhaust gas of the first cylinder bank 11.

The flow transfer line 21 is arranged between the first and the second exhaust line 13, 18. The flow transfer line 21 is connected to the exhaust line 13 which contains the first exhaust-gas turbocharger 14, downstream of the first exhaust-gas turbocharger 14 as viewed in the flow direction of the exhaust gas of the first cylinder bank 11. The connection of the flow transfer line 21 to the exhaust line 13 which contains the first exhaust-gas turbocharger 14 is in particular provided downstream of the first exhaust-gas turbocharger 14 and upstream of the first catalytic converter 15 as viewed in the flow direction of the exhaust gas of the first cylinder bank 11. The connection of the flow transfer line 21 to the exhaust line 18 which contains the second exhaust-gas turbocharger 19 is provided upstream of the second exhaust-gas turbocharger 19 as viewed in the flow direction of the exhaust gas of the second cylinder bank 16.

Furthermore, the first control element 22 is arranged in the flow transfer line 21, by means of which first control element an exhaust-gas mass flow passing through the flow transfer line can be regulated. When the second cylinder bank 16 is activated, a passage through the control element 22 can be blocked by means of the first control element 22. As a result, the exhaust-gas mass flow of the first cylinder bank 11 passes through the first exhaust line 13 and the exhaust-gas mass flow of the second cylinder bank 16 passes through the second exhaust line 18. When the second cylinder bank 16 is deactivated, the passage through the control element 22 can be at least partially opened up. As a result, a part of the exhaust-gas mass flow of the first cylinder bank 11 passes through the first exhaust line 13, and a part of the exhaust-gas mass flow of the first cylinder bank 11 passes through the flow transfer line 21, which branches off from the first exhaust line 13, into the second exhaust line 18. The second exhaust-gas turbocharger 19 in the exhaust line 18 assigned to the second cylinder bank 16 is thus impinged on by the exhaust-gas mass flow of the first exhaust line 13 passing through the flow transfer line 21. The second catalytic converter 20 of the second exhaust line 18 is likewise impinged on by the exhaust-gas mass flow passing through the flow transfer line 21, after said exhaust-gas mass flow has passed through the second exhaust-gas turbocharger 19.

When an activation of the second cylinder bank 16 is predicted, the exhaust-gas mass flow through the first control element 22 can furthermore be increased.

Figure 2:
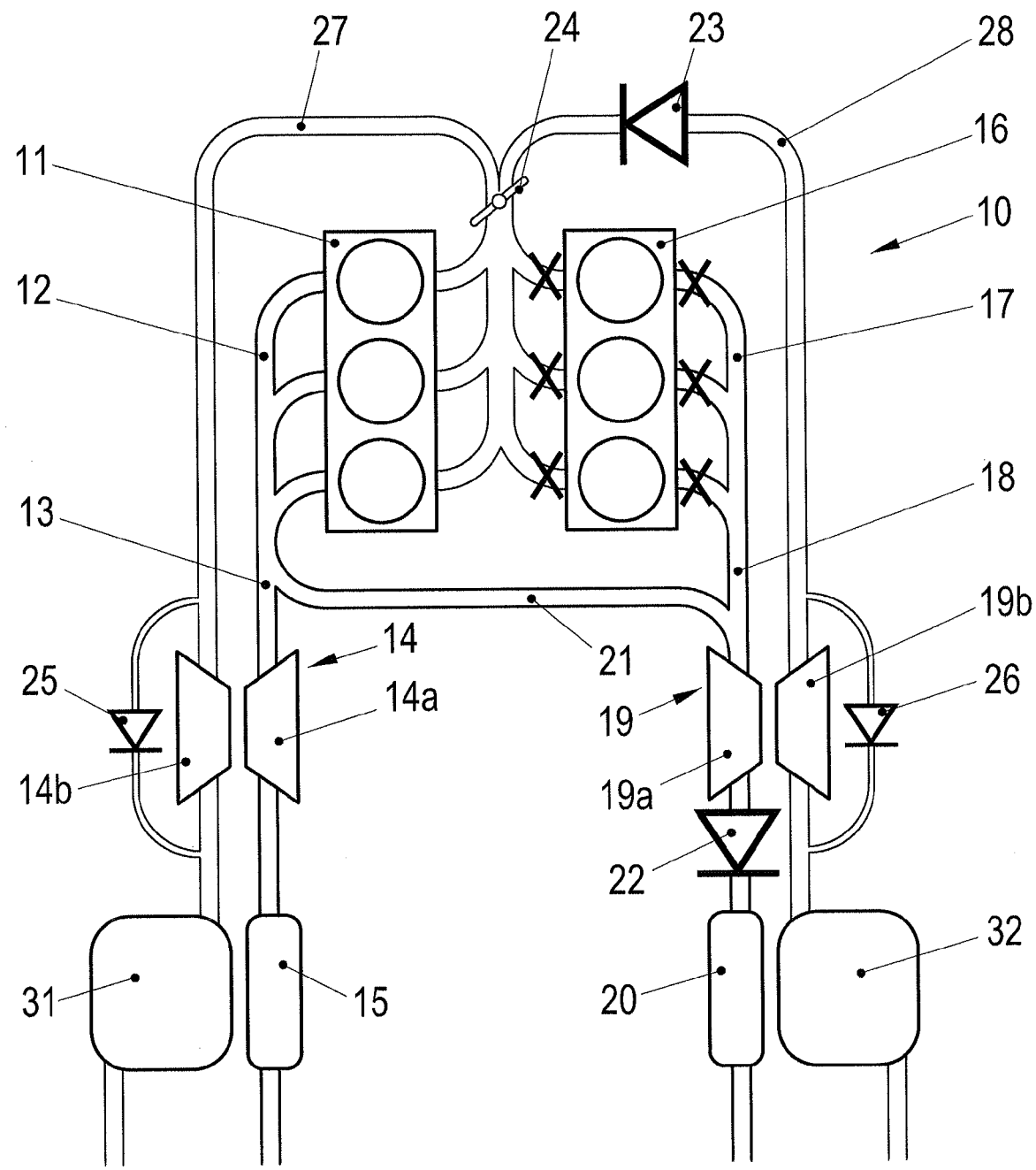
FIG. 2 shows a perspective view of a further preferred exemplary embodiment of the internal combustion engine according to aspects of the invention.

FIG. 2 shows a perspective view of a further preferred exemplary embodiment of the internal combustion engine according to aspects of the invention. The air supply system of the second, deactivatable cylinder bank 16 has an air filter 32, a compressor 19b of an exhaust-gas turbocharger 19, an overrun air recirculation valve 26, a charge air line 28, a throttle flap 24 and an intake manifold.

The air supply system of the second, deactivatable cylinder bank 16 has an air filter 32, a compressor 19b of an exhaust-gas turbocharger 19, an overrun air recirculation valve 26, a charge air line 28, a throttle flap 24 and an intake manifold.

Intake air flows through the air filter 32 into the charge air line 28, wherein during operation of the turbocharger 19, the compressor 19b in the charge pressure line 28 generates a charge pressure. The charge air generated is subsequently supplied to the second, deactivatable cylinder bank 16 through the throttle flap 24 and the intake manifold. The overrun air recirculation valve 26 is arranged in the charge air line 28 and is activated for example by negative pressure. When the engine switches to overrun operation, the overrun air recirculation valve is opened. When the throttle flap 24 is closed and charge pressure still prevails, opening of the overrun air recirculation valve thus prevents a back pressure in the compressor circuit. A compressor wheel of the compressor 19b is thus not braked, but rather the full charger rotational speed is available.

In a preferred embodiment of the invention, the exhaust system of the second, deactivatable cylinder bank 16 has an exhaust manifold 16, a first exhaust line 18, a first exhaust-gas turbocharger 19 or a turbine 19a of the exhaust-gas turbocharger 19, and a second catalytic converter 20.

The exhaust manifold 17 of the second, deactivatable cylinder bank 16 issues into the second exhaust line 18, wherein the second exhaust-gas turbocharger 19 is arranged in the second exhaust line 18 and the second catalytic converter 20 is arranged downstream of the second exhaust-gas turbocharger 19 as viewed in the flow direction of the exhaust gas of the second cylinder bank 16.

The flow transfer line 21 is arranged between the first and the second exhaust line 13, 18. The flow transfer line 21 is connected to the exhaust lines 13 which contain the first exhaust-gas turbocharger 14, upstream of the first exhaust-gas turbocharger 14 as viewed in the flow direction of the exhaust gas of the first cylinder bank 11. The connection of the flow transfer line 21 to the exhaust line 18 which contains the second exhaust-gas turbocharger 19 is provided upstream of the second exhaust-gas turbocharger 19 as viewed in the flow direction of the exhaust gas of the second cylinder bank 16.

The first control element 22 is arranged in the exhaust line 18 which contains the second exhaust-gas turbocharger 19, downstream of the second exhaust-gas turbocharger 19 as viewed in the flow direction of the exhaust gas of the second cylinder bank 16. The first control element 22 is in particular arranged in the exhaust line 18 which contains the second exhaust-gas turbocharger 19, downstream of the second exhaust-gas turbocharger 19 and upstream of the second catalytic converter 20 as viewed in the flow direction of the exhaust gas of the second cylinder bank 16.

An exhaust-gas mass flow passing through the flow transfer line can be regulated by means of the control element 22.

When the second cylinder bank 16 is activated, a passage through the control element 22 can be opened up. The exhaust gas discharged by the second cylinder bank 16 through the second exhaust line 18 can thus pass through the second turbocharger 19 and the second catalytic converter 20.

When the second cylinder bank 16 is activated, a passage through the control element 22 can be at least partially opened up. As a result, a part of the exhaust-gas mass flow of the first cylinder bank 11 passes through the first exhaust line 13, and a part of the exhaust-gas mass flow of the first cylinder bank 11 passes through the flow transfer line 21, which branches off from the first exhaust line 13, into the second exhaust line 18. The second exhaust-gas turbocharger 19 in the exhaust line 18 assigned to the second cylinder bank 16 is thus impinged on by the exhaust-gas mass flow of the first exhaust line 13 passing through the flow transfer line 21. The second catalytic converter 20 of the second exhaust line 18 is likewise impinged on by the exhaust-gas mass flow passing through the flow transfer line 21, after said exhaust-gas mass flow has passed through the second exhaust-gas turbocharger 19.

When an activation of the second cylinder bank 16 is predicted, the exhaust-gas mass flow through the first control member 22 can furthermore be increased.

LIST OF REFERENCE NUMERALS

10 Internal combustion engine
11 First cylinder bank
12 First exhaust manifold
13 First exhaust line
14 First exhaust-gas turbocharger
15 First catalytic converter
16 Second cylinder bank
17 Second exhaust manifold
18 Second exhaust line
19 Second exhaust-gas turbocharger
20 Second catalytic converter
21 Flow transfer line
22 First control element
23 Second control element
24 Throttle flap
25 First overrun air recirculation valve
26 Second overrun air recirculation valve
27 First charge air line
28 Second charge air line
31 First air filter
32 Second air filter

What is claimed:

1. An internal combustion engine comprising:
   a first, non-deactivatable cylinder bank;
   a second, deactivatable cylinder bank;
   first and second exhaust lines which are assigned to the first and second cylinder banks, respectively, and which extend from exhaust manifolds;
   a first exhaust-gas turbocharger in the first exhaust line assigned to the first cylinder bank;
   a second exhaust-gas turbocharger in the second exhaust line assigned to the second cylinder bank;
   a first catalytic converter in the first exhaust line which contains the first exhaust-gas turbocharger, which first catalytic converter is arranged downstream of the first exhaust-gas turbocharger in the flow direction of the exhaust gas of the first cylinder bank;
   a second catalytic converter in the second exhaust line which contains the second exhaust-gas turbocharger, which second catalytic converter is arranged downstream of the second exhaust-gas turbocharger in the flow direction of the exhaust gas of the second cylinder bank;
   a flow transfer line which is arranged between the first and the second exhaust line; and
   a first valve that is configured to regulate an exhaust-gas mass flow passing through the flow transfer line.

2. The internal combustion engine as claimed in claim 1, wherein, when the second cylinder bank is activated, a passage through the first valve is blocked, and when the second cylinder bank is deactivated, the passage through the first valve is at least partially opened.

3. The internal combustion engine as claimed in claim 1, wherein, when the second cylinder bank is activated, a passage through the first valve is opened, and when the second cylinder bank is deactivated, the passage through the first valve is at least partially opened.

4. The internal combustion engine as claimed in claim 1, wherein the flow transfer line is connected to the first exhaust line which contains the first exhaust-gas turbocharger, downstream of the first exhaust-gas turbocharger in the flow direction of the exhaust gas of the first cylinder bank.

5. The internal combustion engine as claimed in claim 4, wherein the flow transfer line is connected to the first exhaust line which contains the first exhaust-gas turbocharger, upstream of the first catalytic converter in the flow direction of the first exhaust gas of the first cylinder bank.

6. The internal combustion engine as claimed in claim 1, wherein the flow transfer line is connected to the first exhaust line which contains the first exhaust-gas turbocharger, upstream of the first exhaust-gas turbocharger in the flow direction of the exhaust gas of the first cylinder bank.

7. The internal combustion engine as claimed in claim 1, wherein the flow transfer line is connected to the second exhaust line which contains the second exhaust-gas turbocharger, upstream of the second exhaust-gas turbocharger in the flow direction of the exhaust gas of the second cylinder bank.

8. The internal combustion engine as claimed in claim 1, wherein the first valve is arranged in the flow transfer line.

9. The internal combustion engine as claimed in claim 1, wherein the first valve is arranged in the second exhaust line which contains the second exhaust-gas turbocharger, downstream of the second exhaust-gas turbocharger in the flow direction of the exhaust gas of the second cylinder bank.

10. The internal combustion engine as claimed in claim 9, wherein the first valve is arranged in the second exhaust line which contains the second exhaust-gas turbocharger, upstream of the second catalytic converter in the flow direction of the exhaust gas of the second cylinder bank.

11. The internal combustion engine as claimed in claim 1, wherein a second valve is provided in a charge air line, by means of which second valve, when the second cylinder bank is activated, a passage through the second valve is opened, and when the second cylinder bank is deactivated, the passage through the second valve is blocked.

12. The internal combustion engine as claimed in claim 1, wherein, when an activation of the second cylinder bank is predicted, exhaust-gas mass flow through the first valve is increased.

13. The internal combustion engine as claimed in claim 1, wherein, when the second cylinder bank is deactivated, the second catalytic converter is impinged on by exhaust-gas mass flow of the first exhaust line.

\* \* \* \* \*